US012033475B2

(12) United States Patent
Lutnick et al.

(10) Patent No.: US 12,033,475 B2
(45) Date of Patent: *Jul. 9, 2024

(54) METHODS, APPARATUS AND ARTICLE OF MANUFACTURE FOR DETERMINING AN OUTCOME OF A GAME WITHOUT PLACING ANY BETS ON THE GAME

(71) Applicant: CFPH, LLC, New York, NY (US)

(72) Inventors: Howard W. Lutnick, New York, NY (US); Geoffrey M. Gelman, New York, NY (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/531,880

(22) Filed: Nov. 22, 2021

(65) Prior Publication Data

US 2022/0084367 A1 Mar. 17, 2022

Related U.S. Application Data

(63) Continuation of application No. 16/826,722, filed on Mar. 23, 2020, now Pat. No. 11,183,028, which is a continuation of application No. 16/186,180, filed on Nov. 9, 2018, now Pat. No. 10,629,033, which is a continuation of application No. 14/319,392, filed on Jun. 30, 2014, now Pat. No. 10,127,774, which is a continuation of application No. 12/492,534, filed on Jun. 26, 2009, now Pat. No. 8,764,015, which is a continuation of application No. 11/688,608, filed on Mar. 20, 2007, now Pat. No. 8,490,977.

(51) Int. Cl.
*G07F 17/32* (2006.01)

(52) U.S. Cl.
CPC .......... *G07F 17/3288* (2013.01); *G07F 17/32* (2013.01); *G07F 17/3244* (2013.01)

(58) Field of Classification Search
CPC .. G07F 17/32; G07F 17/3244; G07F 17/3288; G07F 17/3202; G07F 17/3223
See application file for complete search history.

(56) References Cited

U.S. PATENT DOCUMENTS

| | | | | |
|---|---|---|---|---|
| 5,108,428 | A | 4/1992 | Capecchi et al. | |
| 5,489,300 | A | 2/1996 | Capecchi et al. | |
| 7,524,244 | B2 * | 4/2009 | Walker | G07F 17/3262 463/40 |
| 11,183,028 | B2 * | 11/2021 | Lutnick | G07F 17/3288 |
| 2005/0107151 | A1 | 5/2005 | Amaitis et al. | |
| 2006/0073882 | A1 * | 4/2006 | Rozkin | G07F 17/32 463/25 |
| 2008/0214288 | A1 * | 9/2008 | Toneguzzo | G07F 17/32 463/25 |

FOREIGN PATENT DOCUMENTS

| | | |
|---|---|---|
| JP | 2002507015 | 3/2002 |
| JP | 2002269349 | 9/2002 |
| JP | 2004513409 | 4/2004 |
| WO | 99/46658 | 9/1999 |
| WO | 01/64305 | 9/2001 |
| WO | 01/83058 A2 | 11/2001 |

* cited by examiner

*Primary Examiner* — John E Simms, Jr.

(57) ABSTRACT

In some embodiments, a broker pools funds from multiple clients and uses the funds to place bets in casinos.

18 Claims, No Drawings

METHODS, APPARATUS AND ARTICLE OF MANUFACTURE FOR DETERMINING AN OUTCOME OF A GAME WITHOUT PLACING ANY BETS ON THE GAME

CROSS REFERENCE TO RELATED APPLICATIONS

This application is a continuation of U.S. patent application Ser. No. is a continuation of U.S. patent application Ser. No. 16/826,722 filed Mar. 23, 2020, which is a continuation of Ser. No. 16/186,180 filed on Nov. 9, 2018 (now U.S. Pat. No. 10,629,033 issued Apr. 21, 2020) which is a continuation of U.S. patent application Ser. No. 14/319,392 filed Jun. 30, 2014 (now U.S. Pat. No. 10,127,774 issued on Nov. 13, 2018), which is a continuation of U.S. patent application Ser. No. 12/492,534, filed Jun. 26, 2009 (now U.S. Pat. No. 8,764,015 issued on Jul. 1, 2014) which is a continuation of U.S. patent application Ser. No. 11/688,608 filed Mar. 20, 2007 (now U.S. Pat. No. 8,490,977 issued on Jul. 23, 2013), which are hereby incorporated by reference herein in their entirety.

DETAILED DESCRIPTION

In some embodiments, a broker may place bets on behalf of a player. For example, a player may provide money to a broker. The broker may then take the money and place a bet on a casino game. If there is a payout from the game, the broker may take the payout and then provide the payout to the player. The broker may take a fee from the player. The fee may be deducted from an amount provided for the bet or from a payout. The broker may also be paid by a house or a casino, such as the casino where the broker is placing the bet. For instance, the casino may compensate the broker for bringing in business. A broker may be a human, a legal entity (e.g., a corporation), an algorithm, a computer system, a server, and/or any other capable entity. A broker may work for a casino. A broker may be a casino. A broker may work for the same casino where the broker places bets on behalf of players.

1. Multiple Intermediaries. In some embodiments, one or more intermediaries may handle a player's bet. A player may give money to a first broker. The first broker may pass on the money to a second broker. The second broker may then place a bet using the money (or a portion of the money after broker fees are deducted). Winnings from the bet may then be passed back from the second broker to the first broker, and from the first broker to the player. In some embodiments, there may be any number of intermediaries, such as three, four or five. The use of multiple intermediaries may allow for the massive aggregation of bets. For example, a secondary broker may receive money from five primary brokers. The five primary brokers may each receive money from five players. Thus, the secondary broker may pool money from 25 different players in order to make a bet. The pooling of money may provide advantages, such as allowing the secondary broker to bet in high-limit games, or such as allowing the secondary broker to negotiate better odds with a casino.
    1.1. Brokering Between Casinos. In some embodiments, a casino may serve as a broker. A casino may receive money from a player, or from another broker. The casino may then use the money to place a bet with another casino. The casino may also give the money to the other casino, which may then place a bet with a third casino.

2. Principal/Agent Relationships. In various embodiments, a broker may take the opposite side of a player's bet on his own, e.g., risking his own money. Thus, for example, if the player wins $10 from a bet, the broker may lose $10. In this capacity, the broker may serve as a principal. When a broker takes the opposite side of a bet, the winner of the bet (e.g., the player or the broker) may still be determined based on the outcome of a casino game. For example, the winner of a player places with a broker may still be determined based on the spin of a roulette wheel in a casino. However, the broker need not necessarily actually bet any money with the casino. The broker may simply watch for the outcome of a game and, based on the outcome, determine whether the player or the broker has won. In this fashion, the broker may conceivably give the player better odds than does the casino. For example, if a player bets on "red" in a roulette game, the broker may call the game a push when "00" lands, even if the casino normally would have called the game a win for the casino.

In various embodiments, a broker may serve only as an intermediary, allowing a casino or another party (e.g., another broker) to take the opposite side of a player's bet. In this capacity, the broker may serve as an agent.
3. Finding the Best Rates. A broker may attempt to find games which provide favorable odds, a favorable house edge, or other metrics favorable for a player. This may be one of the services a broker provides. A good broker, for example, may be willing to search through numerous casinos and to visit even out-of-the-way casinos if such casinos provide more favorable odds in a game. Thus, a broker may save a player the trouble of traveling around in search of favorable games.
    3.1. Casino posts odds. In various embodiments, a casino may post odds, payouts, a house edge, jackpot levels, or any other metric about a game. A casino may publish such metrics in a newspaper or other publication, may broadcast such metrics (e.g., on the radio), or may post such metrics to a network, such as to a Web site. A broker may receive metrics about multiple games. A broker may receive metrics from multiple casinos. A broker may thereby determine which games or which casinos have favorable metrics for players.
    3.2. Brokerage firm scans newspapers, has people visiting casinos, has relationships with casinos. In some embodiments, a broker may work with one or more other people. The other people may help the broker to find favorable games, or games with other desirable characteristics. In some embodiments, a firm may employ multiple brokers. Thus, the firm may utilize economies of scale by finding favorable games and then reporting the whereabouts of such games (and any other information about such games) to multiple brokers (e.g., to all the brokers) employed by the firm. A firm may employ people who are not brokers, but who find out about games with favorable characteristics. Such people may then report information about such games so that brokers can place bets at such games on behalf of clients. In some embodiments, a firm may specialize in finding favorable games or games with other desired characteristics. The firm may then sell information about games to a broker and/or to a brokerage firm. In some embodiments, a broker or another person may visit different casinos, observe different games, talk to different casino representatives, talk to players, read publications in search of casino promotions, or perform other functions in an effort to discover games with desirable characteristics. In various embodiments, a broker and/or a firm that employs brokers or works with brokers may have a relationship with a casino. The casino may provide the broker and/or firm with up-to-date information about games at the casino. The broker may, in turn, provide the casino with business in the form of bets. The casino may grant special benefits to the broker, such as providing dedicated gaming tables or dedicated gaming devices at which the broker may place bets, where such gaming tables or 3.3. Broker can negotiate with casinos for better odds if he has a large pool of money behind him. In various embodiments, a broker may negotiate with a casino for a game with more favorable characteristics to a player. The broker may use as a negotiating tool the amount of client money that he represents. For example, if a broker has $1 million in client money he can bet with, a casino may be willing to alter game rules to make them more favorable to players so as to encourage the broker to bet the $1 million at the casino. For example, a broker may negotiate with casino to combine fewer 52-card decks in a game of blackjack (e.g., to combine only two 52-card decks rather than 6 52-card decks), to eliminate the "00" spot from a game of roulette, to double the size of a jackpot, to increase the payout for a flush in video poker, to allow surrendering in a game of blackjack, to allow larger odds bets in a game of craps, or to make some alteration in existing game rules in order to make the rules more favorable for players. In this way, a broker may provide a service to clients. In addition to placing bets for clients, the broker may also negotiate more favorable betting circumstances for the clients. The casinos may, in turn, attract more business by making game rules more favorable.

4. Pooling Bets. In some embodiments, a broker may receive funds from two clients. The broker may combine the funds received from the clients and place a single bet using the combined funds. By pooling client funds, the broker may be able to place bets in games with higher limits than would be available to individual clients. Further, clients may have the ability to bet "odd lots". For example, in a game where bets are taken in increments of $10, a broker may pool $17 from one client with $13 from another client. In some embodiments, when funds are pooled, winnings may be allocated proportionally to funds provided. For example, a client who supplied x % of the funds in a pool may receive x % of the winnings as well. In some embodiments, fees may be divided in proportion to funds provided. For example, if the broker charges a fixed fee per bet placed, a player who provided x % of the funds in a pool may be charged x % of the fixed fee. In some embodiments, each player contributing funds to a pool pays a constant fee, regardless of the percent of the pool contributed. For example, each contributor to a pool may pay $2 per bet placed by a broker. In some embodiments, a broker may pool funds from more than two people. For example, a broker may pool funds from three, four, or five people, or from 100 people. For example, a broker may pool funds received directly from five different players, together with funds received from another broker.

In some embodiments, a broker may pool funds from two players. The broker may use the same pool to make multiple bets. The money remaining in the pool, including winnings and the original funds, may then be distributed back to the two players. The money may be distributed to players in proportion to the size of the original contributions by each player. Prior to distribution, fees may be deducted. Similarly, a broker may pool funds from more than two players, make multiple bets, and then distribute any amounts remaining in proportion to the amounts originally contributed.

5. Netting out opposing positions: cut out the house when two clients bet on pass and don't pass. In various embodiments, two clients of a broker may wish to take substantially opposite positions. For example, a first client may wish to bet on "red" in roulette, while a second client may wish to bet on "black". As another example, a first client may wish to bet "pass" in craps, while a second client may wish to bet "don't pass". In a casino environment, such bets may not be exactly opposite, since there may be situations where neither bet wins. For example, in a game of roulette, neither a bet on "red" nor a bet on "black" may win if the ball lands on "0" or "00". The fact that neither bet may win benefits the house. In various embodiments, a broker may eliminate the house by matching two substantially opposite bets against one another. If a first client takes a first position, and a second client takes a substantially opposite position, then the broker may match the two clients' bets against one another. The broker may then observe a game in a casino. Depending on the outcome of the game, the broker may award both clients bets to either the first client or to the second client. For example, if the first client has bet $10 on "red" and the second client has bet $10 on "black", then the broker may observe a roulette game. If "red" comes up, the first client may receive $20 and the second client may receive nothing, whereas if "black" comes up, the first client may receive nothing while the second client receives $20. If "0" or "00" comes up, there are several possibilities. The broker may return each client's money to the respective client, thereby causing the bet to result in a push or tie. Advantageously, the clients have now not lost their money as they would have by betting with the casino. The broker may instead observe a second game of roulette, and use the results of the second game to determine a winner between the two clients. Upon a result of "0" or "00" (e.g., in the first game) the broker may keep a portion of one or both of the clients' bets. This may serve as a payment for the broker's services. Thus, in some embodiments, a broker may cut out the house by matching substantially opposite bets against one another. The amount saved by cutting out the house may be returned to clients or may be kept by the broker. In some embodiments, a broker may match multiple bets against one another. For example, a broker may have 38 clients, each of whom wishes to place a $10 bet on a different space of the roulette wheel. The broker may thus pit all the bets against one another and cut out the house. The client who is lucky to have his number land will receive the money from all the other clients.

In various embodiments, two clients may desire substantially opposing bets. However, one client may wish to bet a first amount of money, while another may wish to bet a second amount of money, where the second amount of money is greater than the first amount of money. The broker may match the first amount against a portion of the second amount. The remaining portion of the second amount (e.g., the amount left after subtracting the first amount from the second amount) may be placed as a bet with a casino.

6. Audit Trail 6.1. In some embodiments, data generated, transmitted, stored, retrieved, or used may also be stored for auditing purposes. Such data may be made available to regulators to casinos (e.g., to casinos generating the data; e.g., to casinos using the data), or to any other relevant party. Data that may be stored may include data describing the size of a bet made on a game, the type of bet made on a game, intermediate events that occurred during a game (e.g., rolls prior to the final roll in a game of craps), the date of a game, the decision options that were available in a game (e.g., hit, stand in blackjack), the decisions that were made in a game, the outcome of a game, the amount paid to the winner of a game, and any other data about a game. In some embodiments, data about games may be aggregated. For example, data about all the games played by a player during a 1-hour period may be stored in the same location (e.g., in the same file or database entry). Aggregated data may be presented in a single report or other unified presentation. For example, a player may receive a printed receipt or other document describing all outcomes that occurred during a session in which 100 slot machine games were played. In some embodiments, data may be encrypted, digitally signed, or otherwise transformed. For example, various encryption procedures may ensure that data can be verified to be authentic. Thus, for example, if a broker places bets on behalf of a player, the broker may present the data with a digital signature from the casino where the bets were placed. The player may then have at least some assurance that the data is authentic.

In some embodiments, data generated at a first game or a first series of games may be tested or audited to provide verification that the data is fair. In various embodiments, a test may be performed to verify that the data conforms to some statistical distribution. The statistical distribution may be a distribution that is generally thought to govern in the one or more random processes used to generate the data. For example, a set of data may include data about 10,000 outcomes generated at one of a group of roulette wheels, each roulette wheel having 38 spaces. An applicable statistical distribution may predict that each possible outcome of the roulette wheel would occur approximately once every 38 outcomes, or approximately 263 times out of the data set of 10,000 outcomes. Thus, a test of the data about the 10,000 outcomes might test that each of the 38 possible outcomes of a roulette wheel occurred approximately 263 times out of the 10,000 outcomes. The tests may allow for some deviation. For example, it may be considered acceptable for an outcome to occur from 213 to 313 times. However, if an outcome occurs a number of times that is not between 213 and 313, then the data may be considered suspicious.

6.2. In some embodiments, a client may specify in advance rules for betting. The rules specified by the client may include a specification of which games are to be played, which gaming devices are to be used, what times games are to be played at, where games are to be played. The broker may then supply the client with audit information proving that the rules were followed. For example, the broker may provide the client with a printout that shows, for each game, a bet amount, a gaming device identifier, a time of day, a casino, an outcome, and/or a location. In some embodiments, the broker may supply the client with video showing the bets being placed on behalf of the client. The video may include text describing details of the bet, such as the time, date, amount bet, outcome, and payout.

7. Broker's clients share risk, or broker has to place each bet separately (and track which is which). In some embodiments, a broker may pool client money. The broker may record each client's share of the pool (e.g., based on the proportions with which the clients contributed to the pool). When money is distributed from the pool to each client, each client may receive his recorded proportion of the pool In some embodiments, a broker may place separate bets for each client. For example, a first bet may be placed on behalf of a first client, and a second bet may be placed on behalf of a second client. Winnings from the first bet may go to the first client, and winnings from the second bet may go to the second client. A broker may keep track of a bets placed for each individual client. The broker may further keep track of winnings for each individual client. In this way, the broker may be less likely to mix funds belonging to different clients.

In some embodiments, a broker may fill out a log book with details of bets placed. A log book may be paper or electronic. A log book may include entries for a client identifier (e.g., a client name), an amount of a bet, a time of a bet, an outcome, an intermediate outcome, a decision made, and/or a payout. In various embodiments, broker may make an entry in a log book each time a game is played. In some embodiments, a broker may follow a protocol for logging a game. Before the game starts, the broker may enter into a log a player identifier, the amount of a bet, the game, and the time. The broker may then place the bet. When the game finishes, the broker may enter into the same log the outcome and the amount of the payout. The broker (or a program) may periodically tally or aggregate log entries, such as to determine a current balance of client funds. For example, a broker may wish to know when a client's funds have reached a certain level because the client may have specified certain betting rules based on the level (e.g., the client may have specified that betting should stop of the client's funds exceeds $1000).

In various embodiments, a broker may have a logging program that can be synchronized with a gaming device, casino server, gaming table, or other device. The logging program may receive data automatically from the device (e.g., the gaming device) so that the broker is saved from the process of manual entry. For example, a gaming device may automatically transmit game outcomes and payouts to the broker's logging program, for automatic incorporation. In various embodiments, the broker may have a logging program on a hand held device, such as on a personal digital assistant, blackberry, or cell phone. In various embodiments, any person (not just a broker) may carry a device that may receive data from a gaming device. Such data may include outcome data, payout data, betting data, data about decisions made in the game, and any other data.

In various embodiments, logging program may run on a hand held device, such as a device held by the broker. In various embodiments, data may be transmitted to a server (e.g., to the broker server), where logging functions may be performed. Data may be transmitted to the server directly from a gaming device or other casino device, from a casino server, or from the broker's handheld device.

In various embodiments, a broker may not track results on the level of individual games, but may instead track results over groups of games, over playing sessions, over periods of time, etc. For example, broker may record, for a session of 100 games, a starting and ending client balance of funds, a start and end time, a gaming device that was used (or a gaming table that was played at), or any other pertinent information.

8. Immediate reporting of results, such as to clients. E.g., the broker has a PDA and keys in results. PDA may recognize results automatically. In some embodiments, results of games played on behalf of clients may be reported to clients immediately or soon after the games have been played. A broker logging or accounting program may transmit data about games to clients as the data is received or entered. A broker may also configure a gaming device, gaming table, or the casino server to transmit data about games to a client device. A broker may also call clients to report the results of games. In some embodiments, game data may be transmitted to clients under certain circumstances. For example, if a game results in a winning outcome, data about the game may be sent to a client device. A client may even be alerted as to game data. For example, a client's cell phone may be called automatically, or a client may be text message upon the occurrence of particular game results or even upon the occurrence of any game results.

9. Broker Licensing Process. A broker may be in a position of significant trust and responsibility. For example, a broker may handle large amounts of client money. Thus, in some embodiments, a licensing process may be in place for brokers. The licensing process may attempt to train brokers to act in an ethical and responsible manner, and to weed out brokers who are not likely to act in this fashion. The licensing process may train brokers in the mechanics of their business. The licensing process may be a one-time process, or it may be ongoing. For example, a broker may be required to periodically take a test in order to renew his license.

9.1. Background check. A licensing process may include a background check. A candidate's criminal record, credit history, employment history, academic performance, business dealings, business ties, marital history, and other histories may be investigated. People who have known or dealt with the candidate may be interviewed. For example, a candidate who has ever been convicted of a felony or who has every had dealings with a criminal organization may be disqualified.

9.2. Instruction. A candidate may receive instruction. Instruction may come from a classroom environment, from an on-line course, from books, from private instruction, from an apprenticeship, or in any other fashion. A broker may learn various operational procedures, such as how to keep track of individual clients' money when the broker may be handling multiple clients money at once, how to report game results, how to calculate fees, and any other operation details. The broker may also learn ethical obligations, such as an obligation to always play the most favorable game possible, the obligation not to accurately disclose fees, the obligation to return money promptly, and so on.

9.3. Test. A candidate may receive a test. The test may be written, oral, or may include a simulation or actual job scenario. The test may test the candidate's knowledge of ethics, operational details, and any other knowledge relevant to being a broker. The candidate may be required to achieve a certain score in order to become licensed. In some embodiments, a candidate must pass a series of tests to be licensed.

9.4. Ethical rules. In some embodiments, a broker may be forbidden from using his own money to bet on a game with a negative house edge (i.e., a game that has a positive expectation for the player). In some embodiments, a broker may be forbidden from using his own money to get on a game with a negative house edge if such game has limited availability. Absent such a restriction, the broker may take advantage of favorable opportunities himself and deprive his clients of such opportunities in the process. In some embodiments, a broker may be forbidden from every using his own money for gaming.

10. Broker Privileges. Does the broker keep the comp points? In some embodiments, casinos may reward players for the business players provide. Casinos may provide comp points, free meals, upgraded rooms, or any other benefit to players. In some embodiments, a casino may provide a benefit to a broker who places bets on behalf of clients. For example, the casino may provide comp points to the broker. In some embodiments, the broker may keep rewards from the casino for his own use. In some embodiments, the broker may pass on rewards to clients. A broker may first collect a benefit and then provide it to a client. For example, a broker may first reserve a night in a casino suite that has been provided by the casino for free. The broker may then tell a client that the client is welcome to come stay in the suite for free for the night. A broker may also pass on a benefit directly to a client. For example, when a casino awards a free room, the broker may provide the name of a client to the casino. The casino may then allow the client himself to reserve the room and to stay in the room for free. In various embodiments, a casino may create accounts for clients of a broker and credit such accounts with rewards based on the activities of a broker. For example, a broker may have a casino create a comp account on behalf of a client. The casino may be instructed to award comp points to the client account whenever the broker makes a bet at the casino. Thus, a client may receive comp points even without visiting a casino. In various embodiments, a broker may provide instructions as to which client account to credit, depending on the particular client the broker is representing at the moment. For example, a broker may provide a casino with the name (or with the account identifier) of a client whom the broker is currently representing. The casino may then credit the appropriate account based on the broker's gaming activities. In some embodiments, a broker may negotiate with a casino to provide rewards in a form suitable for redemption by a remotely located client. For example, a client who never intends to visit a casino may not value a free night's stay at the casino. Thus, a broker may inform a casino as to a preferred form of a reward for a client. The broker may inform a casino to provide a reward in the form of money, improved game characteristics, or in the form of merchandise that can be shipped to a client.

11. Specification of strategy for the broker to use. Specification of parameters. E.g., bet until you win x or lose y. In various embodiments, rules may be specified by a client for a broker to follow on his behalf. In some embodiments, default rules may be in place. Such rules may be used unless the client specifies other rules. In some embodiments, rules for placing one or more bets may be specified. In some embodiments, rules for playing one or more games may be specified. Such rules may then be followed by an entity acting on behalf of a player, such as by a gaming device, casino employee, or broker. With rules in place, player input on each individual game may be unnecessary. For example, the player may be able to specify rules once and then watch as 100 games are played automatically using those rules. With rules in place, the amount of player input required may be lessened. For example, the player may no longer enter a bet amount prior to each game played, though a player may still enter strategy decisions. Rules for placing bets or for playing games may include one or more of the following: (a) a fixed amount is bet on every game (e.g., $2 on every game); (b) the size of a bet placed on a given game depends on the result (e.g., win, lose) of the prior game; (c) the size of a bet doubles after every loss, but is $1 (or some other fixed amount) after every win; (d) games are repeatedly initiated until X amount in total is won; (e) games are repeatedly initiated until X amount in total is lost; (f) the maximum possible amount is bet on every game; (g) X pay-lines are selected (e.g., in a slot machine game); (h) X number of games are to be played at once (e.g., 3 games are to be played at once); (i) a particular amount of time is to elapse between games; (j) X games are to be played; (k) play is to continue until there have been X wins; (l) play is to continue until there have been X losses; (m) play is to continue until a particular outcome has been achieved (e.g., until the bonus round has been reached); (n) play is to continue until a bankroll or credit balance reaches a certain level; (o) play is to continue until a bankroll or credit balance crosses a certain level; (p) play is to continue until a certain point in time (e.g., until 4:00); (q) play is to proceed, but with periodic pauses in play (e.g., but for five-minute breaks that occur every half hour); (r) X number of games are to be completed in Y period of time (e.g., 100 games are to be completed in 1 second); (s) a particular strategy is to be used (e.g., optimal strategy is to be used; e.g., a strategy to always seek out a royal flush is to be used; e.g., basic strategy is to be used in Blackjack); (t) a bet is to be placed on a game played by a particular player (e.g., a bet is to be placed that Jim Smith will win his game of Blackjack); (u) a bet is to be placed on a game played by a particular category of player (e.g., a bet is to be placed on a game of a player who has won his last five games in a row); (v) a game is to be played with a particular dealer; (w) a game is to be played on a particular gaming device; (x) a particular type of game is to be played (e.g., Texas Tea is played); or any other game rules. In some embodiments, rules for playing on behalf of a first player include rules for selecting a second player, such as a second player on whose games the first player will bet. In some embodiments, rules for selecting players on whose games bets will be made may include rules for selecting players based on demographic information; rules for selecting players based on the games being played by the players; rules for selecting players based on historical outcomes of the players; rules for selecting players based on amounts being wagered by the players; rules for selecting players based on a strategy being used by the players, and any other rules for selecting the players.

12. Other rituals for the broker to use (e.g., blow on dice). A client may request that a broker perform a ritual in conjunction with a gaming activity. For example, the client may request that broker blow on a pair of dice in a game of craps before rolling the dice. Accordingly, the broker may perform the ritual. A client interacting with the broker via a network may enter text which is descriptive of a desired ritual, and may transmit such text to the broker over the network. In some embodiments, a client may request that a broker carry a particular object (e.g., a good luck charm) while placing a bet on behalf of a client. A client may request that a broker bet at certain times (e.g., exactly on the hour). A client may request that a broker use particular machines, particular tables, or particular dealers. In various embodiments, a broker may utilize software which tracks client preferences and rituals. For example, a broker may be able to enter the name of a client into a software program and thereby recall that the client wishes the broker to carry a rabbit's foot when placing a bet. A broker may establish good rapport with a client by keeping accurate track of the client's preferred rituals.

13. Good clients get special deals. E.g., the broker gives a "free ace" special in blackjack to a favored client. Broker has a newsletter about good games. In some embodiments, a broker may gain access to gaming opportunities that are of limited availability. For example, a promotion may allow a player, for only one game, to receive a free ace in blackjack. Such opportunities may be especially favorable to a player, even providing the player with a positive expectation. Because opportunities may have limited availability, a broker may not be able to place bets on behalf of all clients in order to take advantage of such opportunities. In some embodiments, the broker may use various protocols or algorithms for determining which clients will get to participate in the limited opportunities. In some embodiments, a broker may give preference to favored clients, such as clients who have a long history of using the broker, such as clients who have placed a large amount of money with the broker, such as clients who have paid a large amount of fees to the broker, or to any other genre of favored client. A favored client may exhaust an opportunity before a less favored client gets to partake at all. In some embodiments, a favored client may receive a disproportionately greater exposure to a favorable opportunity, but a less favored client may also get the chance to participate. For example, a broker may make a bet in a favorable game, where the bet consists of $80 from a favored client and $20 from a less favored client. In some embodiments, a broker may allow all clients to participate in a favorable opportunity in proportion to the amount of funds they have currently given him. For example, if a first client has provided the broker with $1000 and a second client has provided the broker with $3000, then the broker may make a $100 bet in a favorable game using $25 from the first client and $75 from the second client. In some embodiments, a broker may allow all clients to participate equally in an opportunity. In various embodiments, a broker may select one or more clients at random to participate in a favorable opportunity. In various embodiments, a broker may rotate the opportunity to participate in favorable games among his clients. The manner in which a broker allows various clients to participate in favorable game opportunities may be dictated by ethical rules, by the rules of a regulatory agency, or by statute.

14. The way a broker gets paid.

14.1. Percentage of each bet. A broker may be paid some percentage of each bet placed for a client. For example, a client may pay 0.4% of each bet placed.

14.2. Fixed rate per unit time. A broker may be paid a fixed amount per unit time. For example, a broker may be paid $15 per hour to place bets. The broker may receive separate payments from each client (e.g., each client for whom a broker is making bets may pay $15 per hour). The broker may receive a combined payment from all clients equal to some hourly rate. For example, the broker may have an hourly rate of $15. However, if the broker is betting on behalf of three clients, each may pay the broker $5. Clients may also pay in proportion to the amounts of money each has with the broker (e.g., in a common pool).

14.3. Fixed rate per bet placed. In various embodiments, a broker may receive a fixed payment per bet placed. For example, a client may pay a broker 5 cents per bet placed. In some embodiments, clients may, as a group, pay the broker's fixed rate. For example, each of three clients may be responsible for one third of the broker's fixed rate.

14.4. Percentage of winnings. In various embodiments, a broker may keep a percentage of client winnings. For example, the broker may keep 5% of client winnings. In some embodiments, the broker may not get anything if the client has no winnings. A broker paid in this fashion may be required to make a certain number of bets. Further, the broker may be required to make a certain number of bets of a certain size. For example, the broker must make 100 bets of $10. In this way, the broker is prevented from quitting when the client is ahead just so the broker can be paid.

14.5. Bonus for finding good rates or for beating some index. In some embodiments, a broker may be paid based on his ability to find favorable games. A broker may be paid some amount (e.g., 1 cent) for each bet placed in a game that is deemed unusually favorable. A favorable game may be defined in reference to a reference game. The reference game may have a particular set of rules. If the rules of another game lead to a lower house edge or to some other player benefit, then the other game may be considered favorable. In some embodiments, a broker may be paid based on the difference in house edge between a game and a reference game. For example, the game may have a house edge of 5%, and the reference game may have a house edge of 7%. The broker may then be paid based on the 2% difference. For example, the broker may receive 5 cents for every percentage point (e.g., 100 basis points) difference.

14.6. Broker guarantees a certain house edge. If the broker can find an even more favorable house edge than what he guaranteed, the broker can keep the difference. In various embodiments, a broker may guarantee a client a certain house edge on a game. For example, the broker may guarantee a client that a game has a 5% house edge. If the broker finds a game with a better house edge (e.g., 4%), then the broker may receive a payment equivalent to the amount saved, on average by the client. For example, if the client is betting $1 on a game with a 4% house edge, the broker has saved the client 1 cent, on average, over a scenario where the client would have bet $1 in a game with a 5% house edge. Therefore, the broker may collect the 1 cent as fee.

14.7. Percentage of funds in a pool. E.g., broker keeps 1% per day of average assets. In various embodiments, a broker may keep as a fee a percentage of all the client money he is betting with. The fee may be calculated at various times. The fee may be calculated when a client first provides the money, when remaining client money is returned, or at some point in between. The fee may be charged or assessed on a periodic basis, such as daily. For example, a broker may charge a client 1% of the client's money per day, with the amount of the client's money calculated at the end of the day. Thus, for example, a client may provide a broker with $1000 to bet with at the beginning of a day. At the end of the day, the client may have $800 remaining. The broker may charge the client 1% of the remaining money, or $8.

15. System. A system according to some embodiments may include a client device, a broker device, a casino server, and a network. The system may further include one or more gaming devices, one or more gaming tables, and one or more gaming servers. The client device may be a personal computer, for example, or may be any other computing device. The broker device may be a server, personal computer, handheld device, or any other computing device. In some embodiments, the system may further include a financial institution of a client, and a financial institution of a broker. In some embodiments, a client may use the client device to indicate interest in having the broker place one or more bets on behalf of the client. The client may specify the manner in which the bets are to be placed, including a number of bets to be placed, the size of the bets, the strategy to be employed, and so on. The client may specify an amount of money to be given to the broker. The client may authorize the client's financial institution (e.g., the client's bank; e.g., the client's credit card company) to transfer the amount of money to the broker and/or to the financial institution of the broker. The client may also use the client device to read terms and conditions associated with providing money to the broker. The client may apply a digital signature, check a box, or otherwise indicate agreement with the terms and conditions. The client's request may be received at the broker device, which may be in communication with the client device via a network (e.g., via the Internet). The financial institution of the broker may receive client funds from the financial institution of the broker. The broker may then receive the client funds from the broker financial institution. The broker may also receive funds directly from the client.

The broker may interact with the casino server via the broker device. The broker device may itself be the broker. For example, the broker device may execute algorithms for selecting games and for placing bets on behalf of clients. The broker device may communicate betting information to the casino server. For example, the broker device may communicate information about games to be played and amounts to be bet. The casino server may then conduct such games. For example, the casino server may conduct a slot machine game by generating a random number, determining an outcome based on the generated random number, determining a payout based on the outcome, and crediting the payout to an account associated with the broker. The casino server may also provide directions to a casino employee to conduct a game according the specifications received from the broker. For example, the casino employee may physically spin a roulette wheel and report the outcome to the casino server. In some embodiments, the casino server may instruct a gaming device to conduct a game. For example, if the broker has made a request to bet on a slot machine game, the casino server may direct a slot machine to generate an outcome and to report the result to the casino server. In some embodiments, the broker may not interact with a casino server. Rather a human broker may receive the client's directions from the broker device, the broker device having received the client directions from the client device. The broker may then visit a casino and place bets on behalf of the client in person. The broker may enter the results of a game or gaming session into the broker device, including any amounts won or lost by the client. The broker device may communicate such information to the client device, where the client may view the information. The broker may deposit remaining client funds with the broker financial institution. The broker may also provide such funds to the client financial institution, or directly to the client. Having received client funds, the broker financial institution may transfer such funds to the client financial institution, or directly to the client.

House Edge

"House edge" and "house advantage" may refer to an amount that the house is expected to retain, on average, per unit bet by the player. Depending on circumstances, the house edge may be expressed as a percentage, as a dollar value, as a decimal fraction, or in any other applicable form. For example, a house edge of 5% may indicate that the house can expect to retain 5 cents on average per dollar bet by a player. It should be noted that a statement of a house edge does not imply that the house will necessarily retain the stated amount of a player's bet on each game. The house edge, rather, refers to an expectation or average. For example, suppose a player bets $1 on a game in which he has a 45% chance of winning $2, and a 55% chance of winning nothing. The house edge may be calculated as (0.55*($1−$0)+0.45*($1−$2))/$1=10%. Thus, the house may expect to win 10 cents per dollar wagered by the player.

Benefits a Player can Receive

Benefits that may be provided to a player at a casino may include: (a) money; (b) gaming chips or gaming credits; (c) increased odds of winning; (d) higher payouts (e.g., a jackpot may be increased); (e) reduced costs of wagering (e.g., a player may be given the opportunity to make a wager for $5 that would normally have cost $10); (f) a free game (e.g., a free spin at a slot machine; e.g., a free game of video poker); (g) a free opportunity to enter the bonus round; (h) hints given in a game (e.g., in a game of video poker, a player may receive hints); (i) the free or discounted provision of music, software, a ring-tone, a video, a cartoon, a movie trailer, an animation, a television pilot episode, a news clip, or other sequence; (j) any good; (k) any service; (l) a cashless gaming ticket; (m) a ticket to a show; (n) a ticket to a movie; (o) complementary (comp) points; (p) a voucher; (q) a gift certificate; (r) a voucher for a free meal; (s) a free or discounted stay in a hotel room; and any other benefits.

Gaming Device

A "gaming device" may be any machine, article, or device which allows a player to participate in a game, contest, or other endeavor, and which allows a player to put money or other consideration at risk. Examples of gaming devices may include a Class II gaming device, a Class III gaming device, a video bingo machine, an instant bingo machine, a video poker machine (e.g., Action Gaming's Triple Play™ Draw Poker), a video slot machine (e.g., WMS's Jackpot Party Classic machines), a mechanical slot machine (e.g., IGT's Cleopatra® Slots), an electromechanical slot machine, a video blackjack machine, a video keno machine, and a multi-game machine. Gaming devices may include devices with non-gaming related uses which can also be used or adapted for gaming. For example, a personal computer may constitute a gaming device since the computer may run software for conducting a game and may receive, e.g., a credit card number from a player for the purposes of collecting from and paying money to a player. A gaming device may include a mobile gaming device (e.g., a mobile device as defined by Nevada bill AB 471) or any mobile device that can be used for gaming. A gaming device may include a personal digital assistant, a cell phone, a laptop computer, a Blackberry®, and so on.

The following are embodiments, not claims:

A. A method comprising:
- receiving a first amount of funds from a first client;
- receiving a second amount of funds from a second client;
- creating a pool of funds using the first amount of funds and the second amount of funds;
- placing a first bet using a portion of the pool;
- placing winnings from the first bet into the pool;
- deducting a fee from the pool;
- distributing, after placing winnings into the pool, funds from the pool to the first client and to the second client.

B. The method of embodiment A in which placing a first bet includes placing a first bet on a game of chance using a portion of the pool.

C. The method of embodiment A in which placing a first bet includes placing a first bet in a casino environment using a portion of the pool.

D. The method of embodiment A in which distributing includes distributing, after placing winnings into the pool, funds from the pool to the first client and to the second client, in which the ratio of funds distributed to the first client to funds distributed to the second client is the same ratio as the first amount of funds to the second amount of funds.

E. The method of embodiment A further including:
receiving a third amount of funds from a third client; and
placing the third amount of funds into the pool.

F. A method comprising:
receiving funds from a client;
receiving instructions from the client as to a type of game to play;
receiving first information about a first game of the game type;
receiving second information about a second game of the game type;
determining based on the first information and based on the second information that the first game is more favorable to a player than is the second game;
placing a bet on the first game using the funds;
determining a payout received from the first game; and
providing to the client an amount of money which is based on the funds received from the client and the payout received from the first game.

G. The method of embodiment F in which determining that the first game is more favorable includes determining based on the first information and based on the second information that the first game has a lower house edge than does the second game.

H. The method of embodiment F in which receiving instructions includes receiving instructions from the client to play one of: (a) blackjack; (b) slot machines; (c) video poker; (d) craps; (e) roulette; (f) poker; (g) keno; (h) pai gow poker.

I. The method of embodiment F in which the first game is located at a first casino and in which the second game is located at a second casino.

J. The method of embodiment F in which determining that the first game is more favorable includes determining based on the first information and based on the second information that the first game has a higher jackpot than does the second game.

K. A method comprising:
receiving a first amount of money from a first client;
receiving a second amount of money from a second client;
receiving instructions from the first client to place a first type of bet in a game;
receiving instructions from the second client to place a second type of bet in the game;
determining the outcome of the game without placing any bets on the game; and
providing, based on the outcome of the game, a portion of both the first amount of money and the second amount of money to the first client.

L. The method of embodiment K in which providing includes providing, based on the outcome of the game, both the first amount of money and the second amount of money to the first client.

M. The method of embodiment K further including determining, based on the instructions from the first client and based on the outcome of the game, that the first client would have won had the first type of bet been placed on the game.

N. The method of embodiment M further including determining, based on the instructions from the second client and based on the outcome of the game, that the second client would have lost had the second type of bet been placed on the game.

O. The method of embodiment K further comprising deducting a fee amount from the first amount of money.

P. The method of embodiment O further including determining a house edge of the game and determining the fee amount based on the house edge.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™ and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function hat is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description in accordance with 35 U.S.C. § 112, paragraph 1 and enablement in accordance with 35 U.S.C. § 112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

What is claimed is:

1. An apparatus comprising:

at least one processor configured to control:

receiving, over a communication network, from at least two computing devices of a plurality of computing devices that are remote from the apparatus, a respective at least two bets, in which each of the at least two bets is for a same game type, and in which the apparatus and the plurality of computing devices are of a gaming network;

receiving first information about a first game of a first game type at a first gaming operator and second information about a second game of the first game type at a second gaming operator different than the first gaming operator;

combining the at least two bets into a combined pool, in which an amount of money in the combined pool is larger than a threshold amount for at least one term in the first game type for Which individual bets of the at least two bets do not qualify;

computing based at least in part on the first information, the second information and the at least one term whether the first game at the first gaming operator is more favorable than the second game at the second gaming operator;

in response to computing that the first game is more favorable than the second game, providing, over the communication network, to the at least two computing devices, data about a plurality of games of the first game type through the first gaming operator by following rules for play of the first game type with a given bet placed using a portion of the combined pool;

determining an aggregate of winnings from playing of the plurality of games of the first game; and distributing at least a portion of the aggregate of winnings to at least one of the at least two computing devices.

2. The apparatus of claim 1, wherein a first one of the at least two computing devices places a first bet opposed to a second bet of a second one of the at least two computing devices in the same game type; and wherein the at least one processor is configured to control:

withholding offsetting portions during the play of the plurality of games from being bet through the first gaming operator; and based on outcome of the plurality of games, distributing payout amounts to clients of the first and second bets, payable out of the offsetting portions withheld.

3. The apparatus of claim 1, in which the at least one term includes at least one of increased odds of winning a game of chance or a change in a rule of the game of chance.

4. The apparatus of claim 1, wherein the first game has a higher minimum bet than the second game.

5. The apparatus of claim 1, in which the at least one processor is configured to control determining a house edge of the first game and determining a brokerage fee amount based on the house edge.

6. The apparatus of claim 1, in which the at least one term includes a higher jackpot.

7. The apparatus of claim 1, in which the rules include rules for placing bets.

8. The apparatus of claim 1, in which the rules include a bet amount.

9. The apparatus of claim 1, in which the rules include a bet amount dependent on a prior result.

10. The apparatus of claim 1, in which the rules include an end point for the plurality of games.

11. The apparatus of claim 1, in which the at least one processor is configured to control computing whether the first game at the first gaming operator is more favorable than the second game at the second gaming operator based at least in part on the first information and the second information indicating whether the first game has a higher jackpot than the second game.

12. The apparatus of claim 1, in which the at least one processor is configured to control computing whether the first game at the first gaming operator is more favorable than the second game at the second gaming operator based on determining whether the first game or the second game offers better odds.

13. The apparatus of claim 1, in which the at least one processor is configured to control computing whether the first game at the first gaming operator is more favorable than the second game at the second gaming operator based on determining whether the first game or the second game offers a more favorable house edge.

14. The apparatus of claim 1, wherein the data about the plurality of games of the first game type comprises results of the plurality of games of the first game.

15. A method comprising:

controlling, by at least one processor of an apparatus:

receiving, over a communication network, from at least two computing devices of a plurality of computing devices that are remote from the apparatus, a respective at least two bets, in which each of the at least two bets is for a same game type, and in which the apparatus and the plurality of computing devices are of a gaming network;

receiving first information about a first game of a first game type at a first gaming operator and second information about a second game of the first game type at a second gaming operator different than the first gaming operator;

combining the at least two bets into a combined pool, in which an amount of money in the combined pool is larger than a threshold amount for at least one term in the first game type for Which individual bets of the at least two bets do not qualify;

computing based at least in part on the first information, the second information and the at east one term whether the first game at the first gaming operator is more favorable than the second game at the second gaming operator;

in response to computing that the first game is more favorable than the second game, providing, over the communication network, to the at least two computing devices, data about a plurality of games of the first game type through the first gaming operator by following rules for play of the first game type with a given bet paced using a portion of the combined pool;

determining an aggregate of winnings from playing of the plurality of games of the first game; and distributing at least a portion of the aggregate of winnings to at least one of the at least Wo computing devices.

16. The method of claim 15, wherein the data about the plurality of games of the first game type comprises results of the plurality of games of the first game.

17. A non-transitory storage medium configured to store instructions which, when executed by at least one processor, control:

receiving, over a communication network, from at least two computing devices of a plurality of computing devices that are remote from the at least one processor, a respective at least two bets, in which each of the at least two bets is for a same game type, and in which the at least one processor and the plurality of computing devices are of a gaming network;

receiving first information about a first game of a first game type at a first gaming operator and second information about a second game of the first game type at a second gaming operator different than the first gaming operator;

combining the at least two bets into a combined pool, in which an amount of money in the combined pool is larger than a threshold amount for at least one term in the first game type for which individual bets of the at least two bets do not qualify;

computing based at least in part on the first information, the second information and the at least one term whether the first game at the first gaming operator is more favorable than the second game at the second gaming operator;

in response to computing that the first game is more favorable than the second game, providing, over the communication network, to the at least two computing devices, results of a plurality of games of the first game type through the first gaming operator by following rules for play of the first game type with a given bet placed using a portion of the combined pool;

determining an aggregate of winnings from playing of the plurality of games of the first game; and distributing at least a portion of the aggregate of winnings to at least one of the at least two computing devices.

18. The non-transitory storage medium of claim 17, wherein providing, over the communication network, to the at least two computing devices, the results of the plurality of games, further comprises displaying the results at displays, respectively of the at least two computing devices.

* * * * *